UNITED STATES PATENT OFFICE.

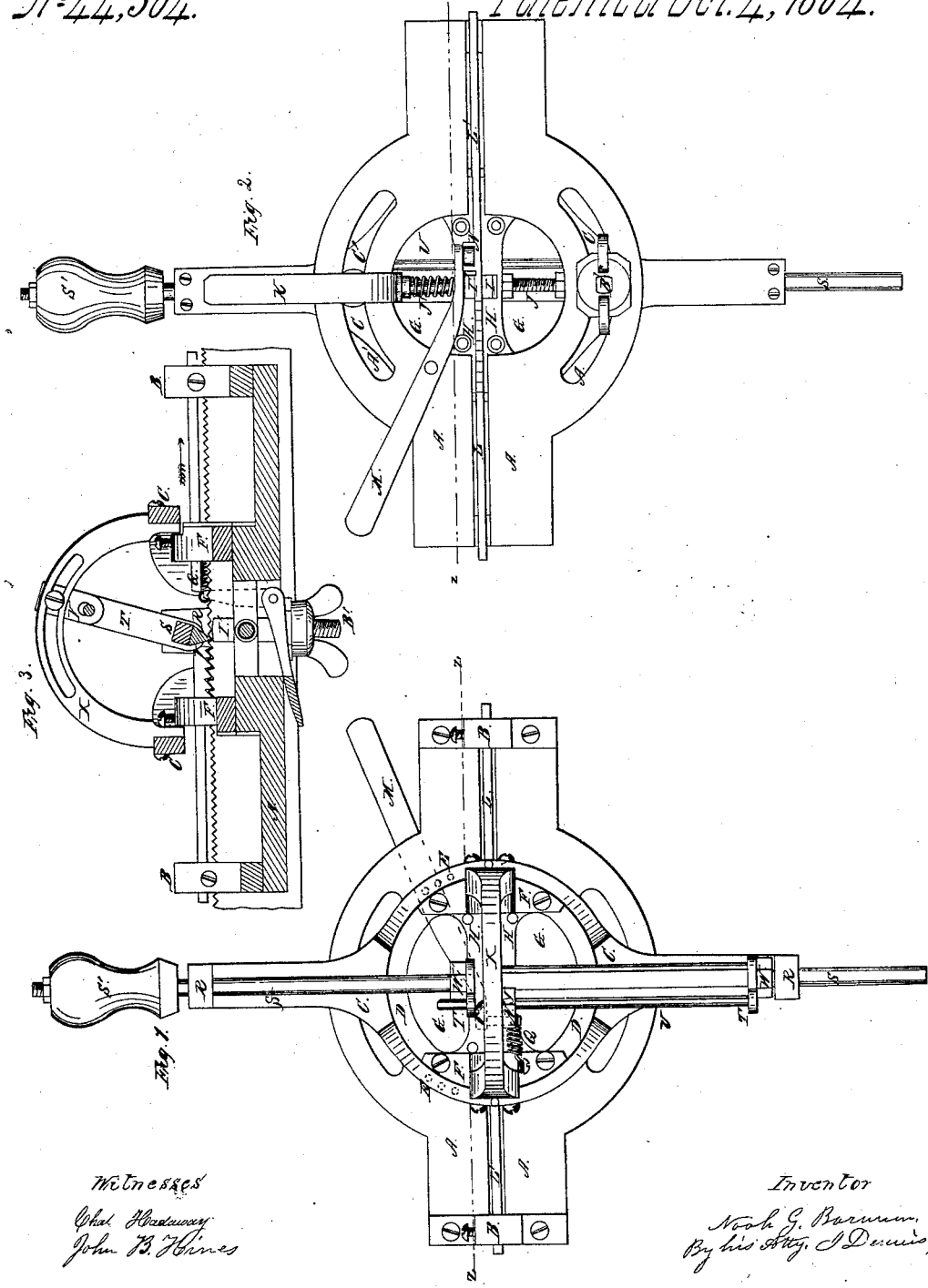

N. G. BARNUM, OF MALAGA, NEW JERSEY.

IMPROVED MACHINE FOR FILING SAWS.

Specification forming part of Letters Patent No. 44,504, dated October 4, 1864.

*To all whom it may concern:*

Be it known that I, NOAH G. BARNUM, of Malaga, in the county of Gloucester and State of New Jersey, have invented a new, useful, and Improved Machine for Filing Saws; and I do hereby declare that the same is described and represented in the following specification and drawings.

To enable others skilled in the art to make and use my invention, I will proceed to describe its construction and the mode of using it, referring to the drawings, in which the same letters indicate like parts in each of the figures.

Figure 1 is a plan or top view of my machine. Fig. 2 is a plan of the bottom of the machine. Fig. 3 is a section on the line $z\,z$ of Figs. 1 and 2.

The nature of my invention and improvements in machines for filing saws consists in the combination and arrangement of devices for clamping, moving, and filing the saws, described and claimed in the following specification and represented in the accompanying drawings.

In the accompanying drawings, A A are the bottom or bed pieces, made of cast metal in the form shown, or in such other form as will answer the purpose, and connected by the brackets B B, which may be screwed on or cast with the bed-pieces A A, to hold them a proper distance apart, to allow the saw to pass between them as the machine is moved on it in the process of filing. The vibrating carriage C C is made in the form shown, and fitted to turn on the semicircular flanges D D on the pieces A A, and there are a series of holes, E E, in the pieces A (shown by dotted lines in Fig. 1) for pins, to limit and stop the carriage C when it is vibrated. The flanges D D are connected by the curved brackets F F, which are screwed on, but may be cast with the pieces A, if preferred. There are some openings G G inside of the flanges D, formed by the flanges on one side and the bars H H on the opposite sides, which bars are parallel each side of the saw with perpendicular scores in the center for the clamping-pieces I I'. Each of these clamping pieces has a stem projecting from it at a right angle through the bars H and into the flanges D.

The stem J of the clamping-piece I has a screw cut on it, and is provided with two nuts, which are screwed against the bar and flange to adjust the piece I, as desired. The stem of the piece I' has but one nut on it, and the spiral spring J' acts between the nut and the bar H to draw the clamping-piece from the saw when the machine is to be moved on it. The clamping-piece I' is pressed against the saw to hold it while it is filed by the bent lever K, with one end on the opposite side of the nut from the spring J, and the other end extends out from under the piece A, and is raised and held up by the workman when he desires to clamp the saw to file it.

A section of a saw is shown in Fig. 3. The bar L is adjusted and held in its place by set-screws in the brackets B and F, and the under side of the inner end of this bar is provided with a series of teeth to fit the teeth of the saw being filed, to adjust the machine on the saw and hold it while the file is operated. The bar L' in the opposite end of the machine is similar to the bar L, except it has no teeth, and it holds up that end of the machine by resting on the teeth of the saw.

There is a perpendicular score in the bar H for the shank of the hook N, which is connected to the lever M, which lever has its fulcrum on the under side of the piece A at the pin P. The hook N hangs across the edge of the saw at the inner end of the bar L', and when the workman has filed a score in the saw he raises the end of the lever M, which lifts the teeth on the bar L out of the saw and pushes the machine to the right, as shown by the arrow in Fig. 3, the hook N swinging away from the bar L' as the machine is moved one tooth on the saw. When the machine is dropped to file the next score, the spiral spring Q draws the hook back to the end of the bar L' ready to lift the machine again after a score has been filed. One end of the spring Q is on the hook N, and the other end is on a screw in the bracket F.

The vibrating carriage C has two projections extending from it and terminating in upright stands R R, which are perforated for the traverse-rod S of the file-carriage to run in. This file-carriage consists of the rod S, arms T T, with their upper ends connected by the rod U. The lower ends of the arms T are perforated for the ends of the file V. (Shown in section in Fig. 3.) The file is placed between the lower ends of the arms, and the nuts W on the rod S are screwed up to clamp the file and hold it firmly.

There is an arch, X, on the carriage C, with a curved slot in it for the screw which holds the stand Y, which is perforated for the rod U of the file-carriage to traverse in. The use of the stand Y is to hold the file at the angle required, the slot in the arch permitting the stand to be adjusted for that purpose.

The traverse-rod S has a handle, S', at one or both ends, by which it is worked.

There are some curved slots A' in the pieces A for the bolt B' and screw C', Fig. 2, to traverse in when the carriage is vibrated, which bolt and screw hold the carriage C to the pieces A.

I claim—

1. In combination with the bed-pieces A A or divided disk, arranged to traverse on the saw, and constructed as described, the vibrating or revolving carriage C, turning on the flanges D D of the disk, and carrying the adjustable file-carriage.

2. In combination with the divided disk or bed-pieces A A, the adjustable clamping-piece I, arranged substantially as described.

3. In combination with the divided disk, the traversing clamping-piece I', operated by a lever and spring, J, substantially as described.

4. The adjustable rod L, provided with a series of teeth fitting between the teeth of the saw to adjust the apparatus on the saw, substantially as described.

5. In combination with the divided disk, the lever M, hook N and spring Q, for raising the apparatus and file from the saw when it is moved from one notch to another on the saw.

6. In combination with the divided disk and the vibrating frame, the stop pins E E, which limit the vibration of the frame.

7. The guide-pieces R R on the vibrating frame, and the traverse-rod S, in combination with the clamping arms T T, which hold the file, substantially as described.

NOAH G. BARNUM.

Witnesses:
J. DENNIS, Jr.,
DANL. ROWLAND.